United States Patent [19]

Richey

[11] 4,211,061

[45] Jul. 8, 1980

[54] FLEXIBLE DISC CROP PICK-UP DEVICE

[75] Inventor: Clarence B. Richey, West Lafayette, Ind.

[73] Assignee: Purdue Research Foundation, West Lafayette, Ind.

[21] Appl. No.: 949,805

[22] Filed: Oct. 10, 1978

[51] Int. Cl.[2] .......................................... A01D 45/00
[52] U.S. Cl. ..................................... 56/327 R; 171/14
[58] Field of Search ................... 56/327 R; 171/1, 14, 171/88

[56] References Cited

U.S. PATENT DOCUMENTS

| | | | |
|---|---|---|---|
| 2,588,764 | 3/1952 | Richmond | 56/327 R |
| 2,606,416 | 8/1952 | Bruner | 56/327 R |
| 2,994,177 | 8/1961 | Bruner | 56/327 R |
| 3,340,935 | 9/1967 | Csimma | 171/14 |
| 3,796,268 | 3/1974 | Porter | 56/327 R X |
| 3,921,723 | 11/1975 | Seem | 171/14 |

*Primary Examiner*—Russell R. Kinsey
*Attorney, Agent, or Firm*—John R. Nesbitt

[57] ABSTRACT

A harvester pick-up is disclosed for harvesting agricultural products which are located above, but in contact with, or very close to, the field surface. The agricultural products, such as tomatoes, are seized between two contra-rotating flexible discs which are operated in contact with the field surface and deformed thereby to lift all agricultural products located on said field surface up above the discs where they are then discharged into a conveyor belt.

13 Claims, 8 Drawing Figures

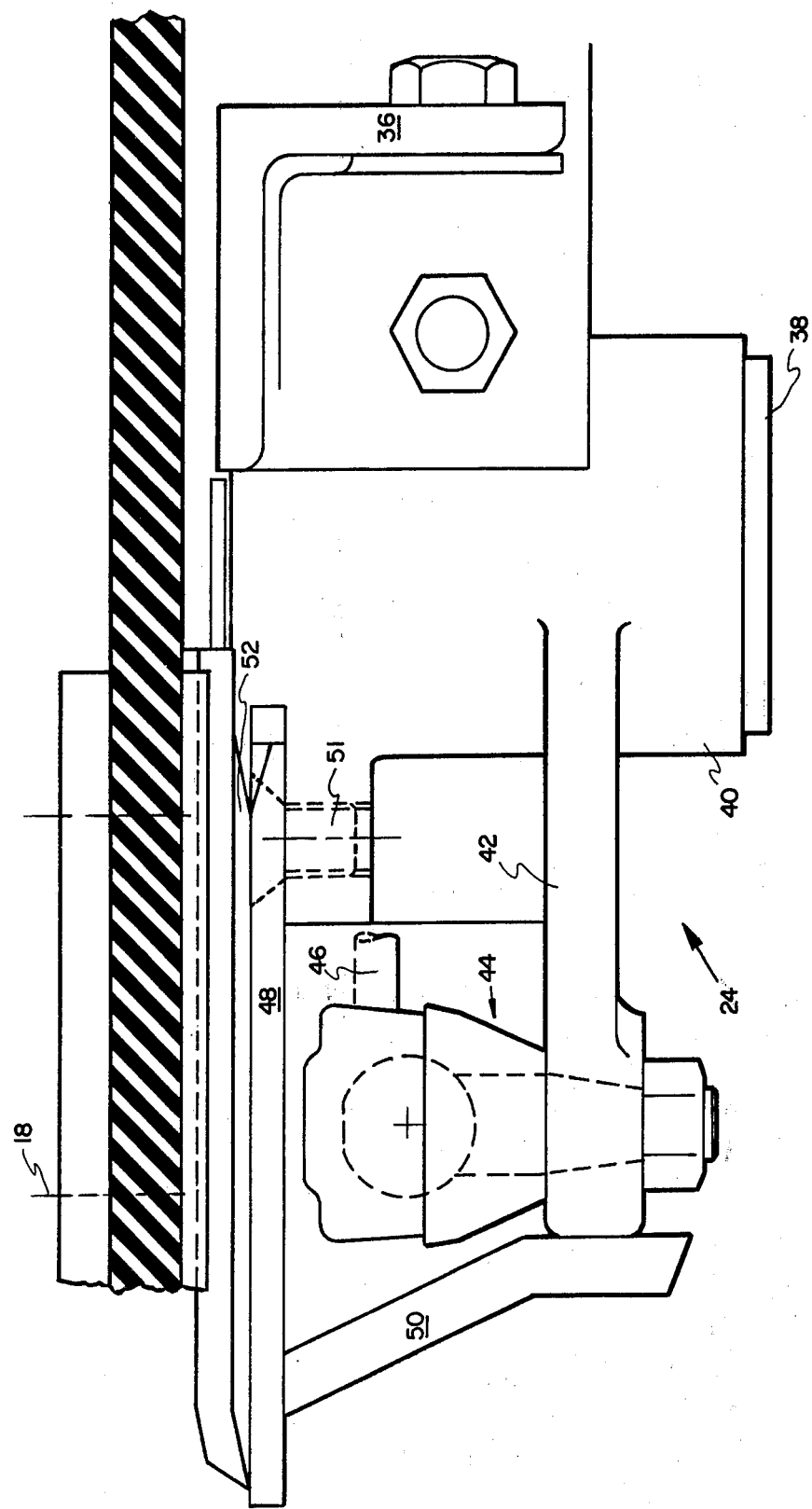

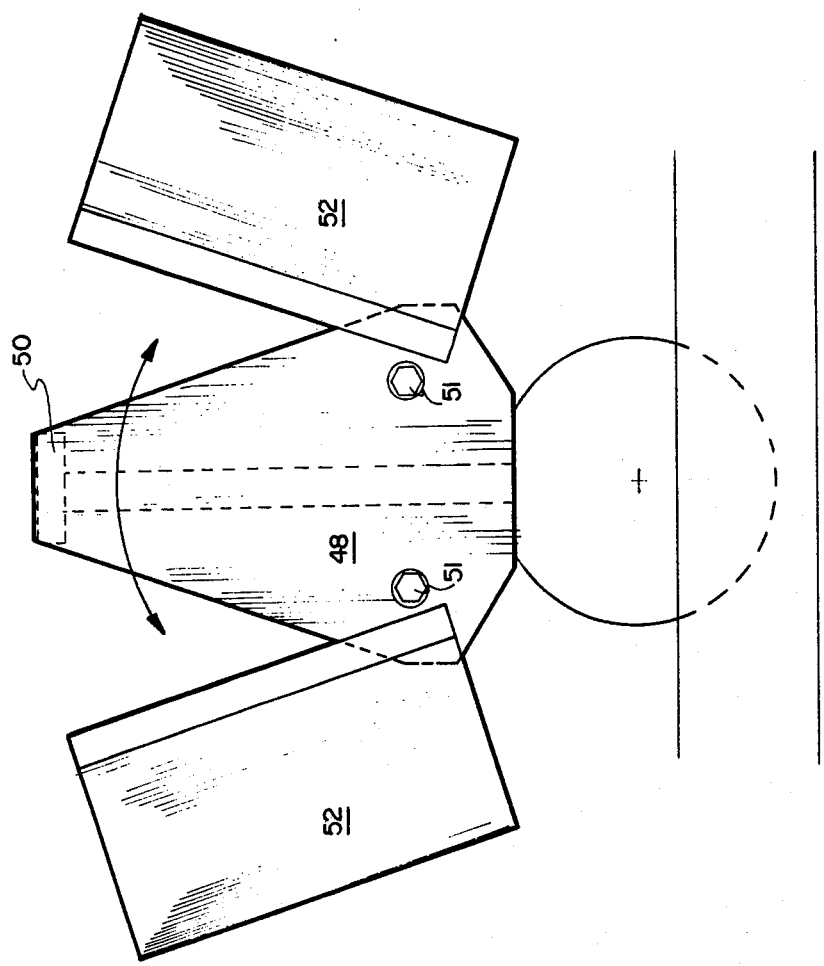

FLEXIBLE DISC CROP PICK-UP DEVICE

FIELD OF THE INVENTION

This invention relates to a pick-up for harvesters, and more particularly, relates to harvesters used to harvest tomatoes and other above ground agricultural products.

BACKGROUND OF THE INVENTION

Present harvester pick-ups for vegetables which may rest on the ground surface usually must cut below the surface of the ground to get all the crop. Sickle-bars operating below the ground surface have been widely used as have various types of sweep knives. However, when using any of such devices, soil is unavoidably taken into the harvester and must be shaken or sorted out. If the soil is moist it will not shake out but builds up on all the parts it contacts, soiling the crop and soon clogging the machine at various points. This is not as much of a problem in dry conditions in the irrigated far west, where the water can be shut off, as it is in the midwest.

Large forwardly-tilted steel disks with notched edges and overlapping to shear stems do a good job of gathering and lifting the crop onto the conveyor but the front edges must run under the soil surface in order to get all the crop. They also take in soil. Examples of such pick-ups are shown in U.S. Pat. Nos. 2,588,764; 2,606,416; 2,994,177; 3,796,268; and 3,921,723.

Those working in this field have, for some time, been trying to devise a harvester pick-up which will get the crop without taking in soil.

SUMMARY OF THE INVENTION

This invention utilizes tilted, contra-rotating flexible discs, stiff enough to resist folding under but flexible enough to flatten out and ride on the ground surface, to sweep the crop to the center of the harvester pick-up and lift it onto the conveyor without taking in soil. Any one of a number of devices may be used with the discs to sever plant stems, when required.

It is therefore an object of this invention to provide an improved harvester pick-up to pick-up, from the field surface, tomatoes, cucumbers, peppers, lettuce, strawberries, and other low-growing crops for once-over mechanical harvest, without taking in soil.

It is still another object of this invention to provide an improved harvester pick-up for harvesting agricultural products under wet soil conditions.

It is yet another object of this invention to provide an improved harvester pick-up with reduced drive power requirements which results in energy savings.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiments of the herein disclosed invention are meant to be included as come within the scope of the claims.

BRIEF DESCRIPTION OF THE DRAWINGS

The accompanying drawings include and illustrate one complete embodiment of the invention according to the best mode so far devised for the practical application of the principles thereof, and in which:

FIG. 3 is an enlarged side view of the preferred vine and stem cutter taken along line B—B in FIG. 1.

FIG. 3A is a top view of the vine and stem cutter shown in FIG. 3.

DESCRIPTION OF THE INVENTION

Figure 1:
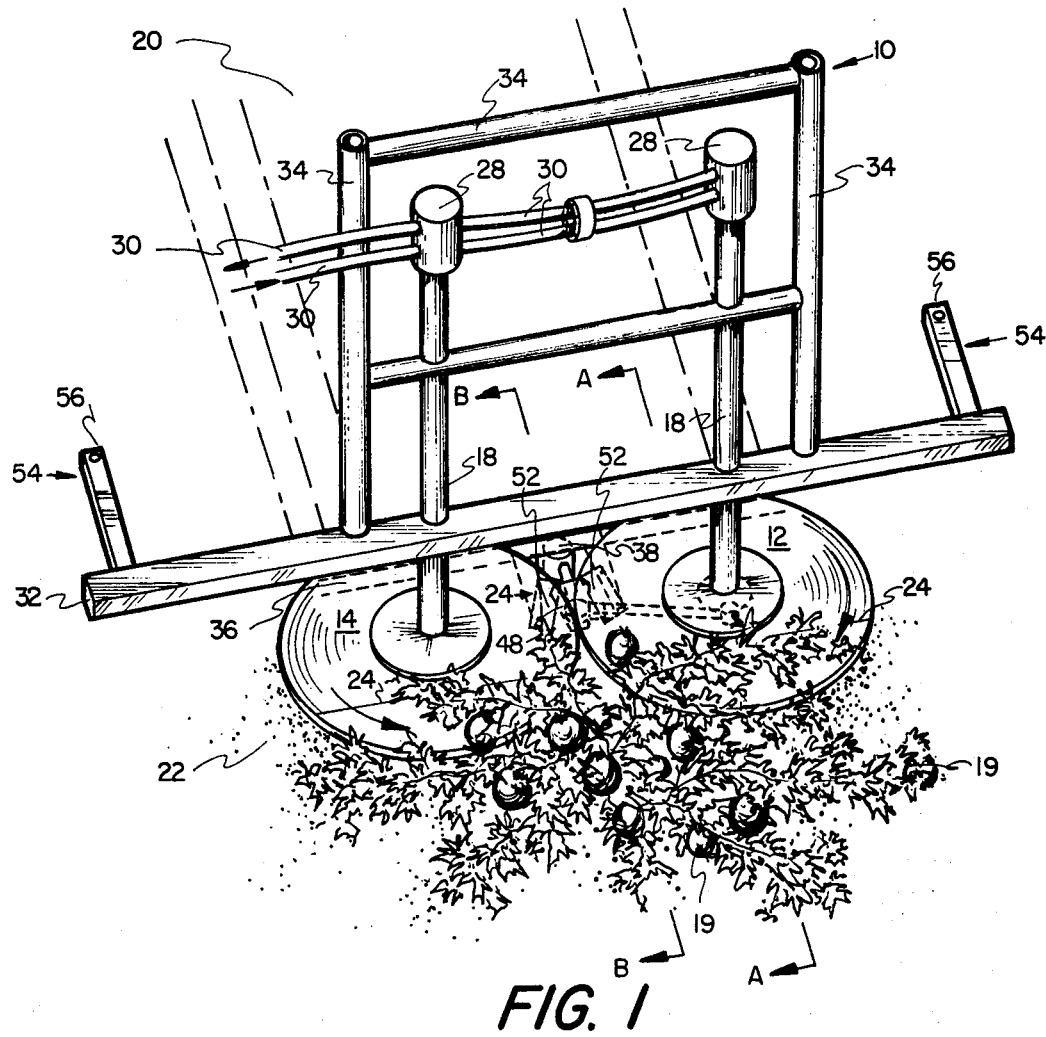
FIG. 1 is a perspective view of the device of this invention.
Figure 2:
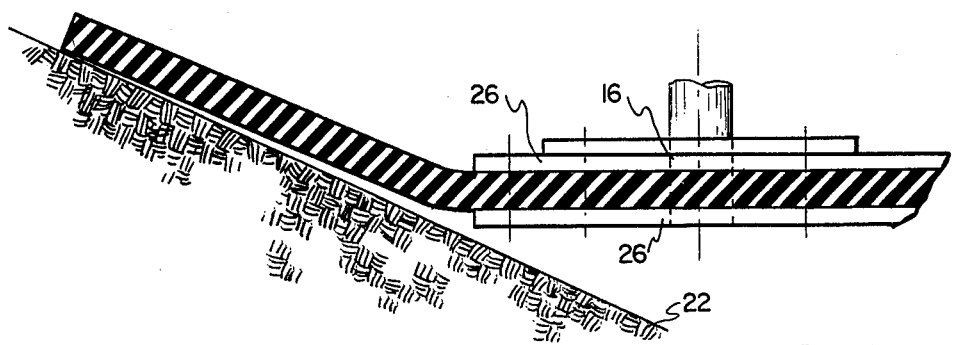
FIG. 2 is an enlarged cross sectional view of the discs of the device taken along line A—A in FIG. 1.

The device 10 of this invention includes a pair of rotatable discs 12 and 14, mounted on rotatable shafts 16, which are housed in housing 18. The bottom ends of the housings carry shaft bearings (not shown). Each shaft 16 extends near its lower end through a disc which is about 25 inches in diameter and about one half inch thick and is typically from 5 ply flexible conveyor belting, or the like. The flexible material is selected so that it is pliable enough to deform and follow the ground surface, but yet it must be stiff enough not to fold back upon itself when rotated and placed in contact with the ground. The discs are contra-rotated as shown by the arrows in FIG. 1 to pick-up and establish a flow of agricultural products, such as tomatoes 19, above the discs, which products are then lifted and dropped on a conveyor 20, such as a potato conveyor of a type well known in the art.

As the discs 12 and 14 are placed in contact with the ground surface 22, the discs deform along lines 23, whereby the products 19 are lifted on top of the discs and moved above swingable knife assembly 24 (as shown in FIG. 3) and then dropped onto conveyor 20.

The discs are secured to the shaft by a pair of clamp plates 26 and these plates may be keyed or secured to the shaft by any other convenient expedient. These plates are typically 10 inches in diameter and ⅛ inch thick. This size plate is not critical but does work well to adequately support the flexible discs without interfering with its desired flexing action when in ground contact.

The discs are driven by hydraulic motors 28, which are activated by the hydraulic system of the tractor or other prime mover (not shown) used to propel the harvester through fluid lines 30.

The shaft housings 18 are secured to frame members 32 which has other support members 34 associated with it and this frame structure is of a type commonly used with the digging disc type harvesters shown and described in the U.S. Patents mentioned above in this application. Frame members 54 are adapted at their rear portions 56 for connection to a harvester device.

An additional frame member 36 is added to the typical harvester construction described to support knife assembly 24. The swingable knife assembly 24 is a modified form of a design used by John Deere Company in their 34 Forage Harvester model.

Knife assembly 24 includes a fixed spindle 38 which extends downwardly from cross frame member 36, and rotatably mounted thereupon is hub 40 which is connected through torque arm 42 to joint assembly 44 (details not shown) and assembly 44 is connected through pitman 46 to a power source (not shown) which may be driven from disc shaft 16, or powered in some other way to relate speed of the cutter knife to ground speed of the harvester machine. This timing function of the cutter knife, while convenient, is not crucial to the invention here described.

The swingable knife 48 is supported by plate 50 and secured by bolts 51 to hub casting 40 and oscillates from side to side, as indicated by the arrow in FIG. 1, as pitman 46 is activated. Shear plates 52 are positioned above knife blade 48 and act with the knife to cut plant stems as the discs lift and pull them upward between the shear plates.

Another means of cutting the plant stems is a sickle-bar placed just in front of the conveyor above the ground surface and under the tilted portion of the discs.

Other embodiments of the discs have been used, and are shown in FIGS. 4 through 7.

Figure 4:
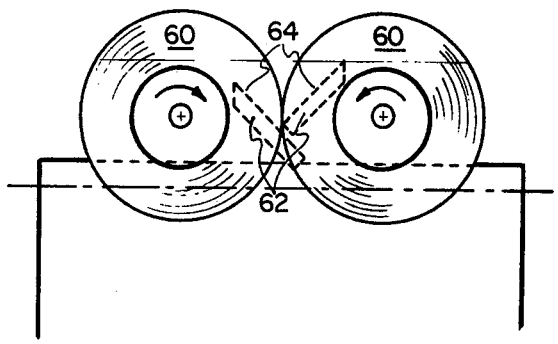
FIG. 4 is an alternate embodiment showing a top schematic view of the discs with two stationary knives.

FIG. 4 shows discs 60 which have fixed knives 62 positioned below them with the cutting edges 64 of such knives disposed from about the intersection point of the disc peripheries to a point slightly forward.

Figure 5:
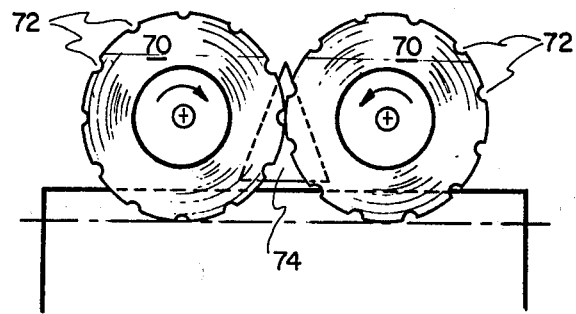
FIG. 5 is an alternate embodiment showing a top schematic view of modified discs having peripheral cut outs, and an alternate fixed cutting device is also shown.

FIG. 5 shows discs 70 with peripheral notches 72 which tend to pick-up vines and stems and convey them against fixed knife 74 disposed between and below the point of peripheral intersection of the discs.

Figure 6:
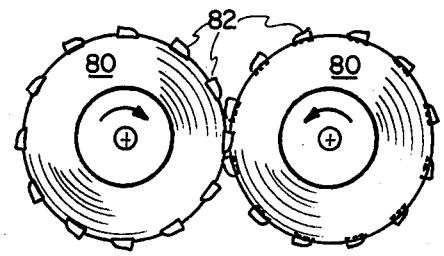
FIG. 6 is another alternate embodiment showing a top schematic view of modified discs having cutting knives fixed to the disc peripheries.

FIG. 6 shows discs 80 with knives 82 fixed to the disc peripheries. In using this configuration the discs must be kept in time (not an essential requirement with the preferred embodiment) to prevent knife collision. The knives 82 are preferably disposed above the top surface of one disc 80, and below the bottom surface of the other disc 80. This embodiment may also be used with the entire periphery of the discs formed of a flexible material capable of maintaining a cutting edge for a reasonable length of time.

Figure 7:
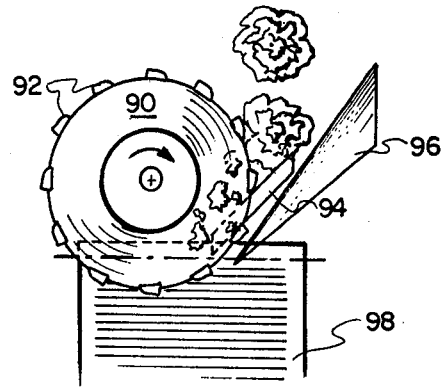
FIG. 7 is still another alternate embodiment showing a top schematic view of a single disc using pick-up protrusions located on the disc periphery, and showing the disposition of a stationary crop cutting knife.

FIG. 7 illustrates the use of a single flexible disc 90 with protuberances 92 on its periphery. This type disc is useful in harvesting low growing crops without significant mass, such as lettuce, as the single disc lifts and sweeps the crop to the side against a blade 94 where it is cut then thrown against deflector 96 and then the deflector discharges the crop to the conveyor 98.

What is claimed is:

1. A harvester pick-up device for harvesting agricultural products, said device including at least one movable means that is a flexible disc having sufficient pliability for substantial deforming of said disc, said disc having a portion positioned below agricultural products to be harvested and contacting, but not invading, the ground surface upon which said products are located, the said movable means operating to lift and convey said products toward the rear of said device.

2. The device of claim 1 including first and second movable means which are flexible discs having contiguous outer peripheries, said movable means moving in contra-rotating relationship whereby agricultural products received between said discs are lifted and conveyed toward the rear of the device while passing therebetween, and wherein said discs are mounted for contact with a ground surface upon which the agricultural products to be harvested are located.

3. The device of claim 2 wherein a portion of the outer periphery of at least one of said discs is disposed to contact said ground surface and to maintain rotation with respect thereto while flexing thereagainst at the same time.

4. The device of claim 2 wherein at least one of said discs has cutting means located on at least a portion of its periphery.

5. The device of claim 2 wherein at least one of said discs has indentations on a portion of its periphery.

6. The device of claim 2 wherein at least one of said discs has protuberances on a portion of its periphery.

7. The device of claim 2 wherein the outer periphery of each of said discs has an irregular surface.

8. The device of claim 7 wherein the irregular peripheries of said discs are substantially identical to one another.

9. The device of claim 2 wherein each flexible disc is made of material which has a stiffness such that said disc deforms to follow ground surface but does not bend back under itself when the said disc is carried forward over the ground surface by a harvester to which it is attached.

10. The device of claim 1 wherein said first and second means may have dissimilar peripheral velocities.

11. The device of claim 9 wherein said first and second discs have about a 25 inch diameter and about a ½ inch thickness.

12. The device of claim 2 wherein said discs are rotated in opposite directions with respect to one another to draw material into said device between said discs, and cutting means disposed adjacent the point at which said material is drawn therebetween.

13. A device for harvesting low growing rooted lightweight agricultural products, said device comprising:
a flexible disc having an irregular peripheral surface and sufficient pliability for substantial deforming of said disc;
disc mounting means for positioning said disc in flexing contact with the ground surface above which said lightweight agricultural product is disposed;
drive means connected with said disc for causing rotation of said disc whereby agricultural products are picked up by the top surface of said disc when said disc is in said flexing contact with the ground surface; and
cutting means disposed adjacent the periphery of said disc whereby said rooted agricultural products are drawn adjacent said cutting means and severed and discharged due to the peripheral rotation of said disc.

* * * * *